(12) United States Patent
Suzuki et al.

(10) Patent No.: US 7,739,837 B2
(45) Date of Patent: Jun. 22, 2010

(54) ELECTRIC POWER-FEEDING STRUCTURE

(75) Inventors: Kaoru Suzuki, Kosai (JP); Atsuyoshi Yamaguchi, Kosai (JP); Takehiko Uehara, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/208,114

(22) Filed: Sep. 10, 2008

(65) Prior Publication Data

US 2009/0066156 A1  Mar. 12, 2009

(30) Foreign Application Priority Data

Sep. 10, 2007  (JP)  ............... 2007-234121

(51) Int. Cl.
*E05F 11/44* (2006.01)
(52) U.S. Cl. .......................... 49/351; 49/350
(58) Field of Classification Search .................. 49/348, 49/349, 350, 351, 358
See application file for complete search history.

(56) References Cited

U.S. PATENT DOCUMENTS

| | | | |
|---|---|---|---|
| 4,939,867 A | | 7/1990 | Harada et al. |
| 5,537,782 A | * | 7/1996 | Klippert et al. ............... 49/358 |
| 5,715,630 A | * | 2/1998 | Szerdahelyi et al. ........... 49/351 |
| 7,213,370 B2 | * | 5/2007 | Dedrich et al. ................. 49/358 |
| 7,500,331 B2 | * | 3/2009 | Hiramatsu .................... 49/358 |
| 2004/0111970 A1 | * | 6/2004 | Fenelon ........................ 49/349 |

FOREIGN PATENT DOCUMENTS

| | | | |
|---|---|---|---|
| JP | 61-60345 A | | 3/1986 |
| JP | 04155083 A | * | 5/1992 |
| JP | 7-156093 A | | 6/1995 |
| JP | 2002-307369 A | | 10/2002 |
| JP | 2005-57828 A | | 3/2005 |

OTHER PUBLICATIONS

Extended European Search Report for EP 08015953 dated Jan. 22, 2009.

* cited by examiner

*Primary Examiner*—Jerry Redman
(74) *Attorney, Agent, or Firm*—Sughrue Mion, PLLC

(57) ABSTRACT

An electric power-feeding structure for feeding electric power to a moving body which is driven to be raised or lowered, includes: an arm having a distal end connected to the moving body movably in a horizontal direction and a proximal end rotatably driven to swing, to thereby drive the raising or lowering of the moving body. An electrical wire is routed alongside the arm, and one end of the electrical wire extending from the distal end is connected to the moving body. In a vicinity of a rotating shaft of the arm, the electrical wire is fixed to the arm at a first fixing point and to a base for supporting the arm at a second fixing point. The first fixing point is provided on a straight line defined by the rotating shaft and the second fixing point when the arm is at an intermediate position of its swinging range.

2 Claims, 6 Drawing Sheets

ELECTRIC POWER-FEEDING STRUCTURE

BACKGROUND OF THE INVENTION

1. Technical Field

The present invention relates to an electric power-feeding structure for feeding electric power to a moving body which is driven to be raised or lowered, such as a window glass of a motor vehicle.

2. Background Art

In the window glass of a motor vehicle, such as an automobile, electric power is fed to the window glass in which a heating wire is laid for such as the prevention of dew condensation. As an electric power-feeding structure for feeding electric power to the window glass in cases such as where the heating wire is laid in the window glass which is driven to be raised or lowered, an electric power-feeding structure shown in FIGS. 7A and 7B is conventionally known.

In the electric power-feeding structure shown in FIGS. 7A and 7B, a moving body-side connector 105 provided on a window glass 102 which is disposed in an inner space of a door 101 and is driven to be raised or lowered, and a door-side connector 106 provided in the door 101 are connected via a feeding line to feed electric power to the window glass 102. Looseness is produced in the feeding line in conjunction with the raising or lowering of the window glass 102, and in a case where the amount of looseness is large and if such a feeding line is able to move without any restriction, there is a possibility of causing a malfunction such as the feeding line becoming bitten by a raising and lowering mechanism of the window glass 102. For this reason, the looseness produced in the feeding line is restricted by an excess-length absorbing device 103 disposed in the inner space of the door 101.

The excess-length absorbing device 103 is so configured that the feeding line is accommodated in a case 111 in such a manner as to be turned back in a U-shape along the raising or lowering direction of the window glass 102. On end portion side (indicated by reference numeral 104 in the drawings) of the feeding line is held by a sliding member 112 engaged with the case 111 movably in the raising or lowering direction of the window glass 102, is led out from the case 111, and is connected to the moving body-side connector 105. The sliding member 112 moves vertically while being accompanied by the deformation of the feeding line turned back in the U-shape inside the case 111, and the feeding line 104 follows the raising or lowering of the window glass 102. Although looseness is produced in the feeding line within the case 111 in conjunction with the vertical movement of the sliding member 112, its movement is restricted to within the case 111, and the biting by the raising and lowering mechanism of the window glass 102 is prevented (refer to patent document 1).

[Patent Document 1] JP-A-2005-57828

In the electric power-feeding structure disclosed in the patent document 1, the feeding line is accommodated in the case 111 in such a manner as to be turned back in the U-shape along the raising or lowering direction of the window glass 102 to cope with the raising or lowering of the window glass 102. In this case, an excess length by at least more than half the stroke of the window glass 102 is required for the feeding line, and the amount of looseness produced in the feeding line in conjunction with the raising or lowering of the window glass 102 is also relatively large. For this reason, the case 111 for accommodating the feeding line is necessary, and the case 111 becomes large in size. It is difficult to further secure an accommodation space for the case 111 in the inner space of the door 101 in which the window glass 102 and its raising and lowering mechanism are accommodated.

SUMMARY OF THE INVENTION

The present invention has been devised in view of the above-described circumstances, and its object is to provide a miniaturized and simplified electric power-feeding structure for feeding electric power to a moving body which is driven to be raised or lowered.

To attain the above object, in accordance with an aspect of the invention there is provided an electric power-feeding structure for feeding electric power to a moving body which is driven to be raised or lowered, including:

an arm having a distal end connected to the moving body movably in a direction perpendicular to a raising or lowering direction of the moving body and a proximal end adapted to be rotatably driven so as to swing, to thereby drive the raising or lowering of the moving body, wherein an electrical wire is routed alongside the arm, and one end of the electrical wire extending from the distal end of the arm is connected to the moving body to feed electric power to the moving body, wherein, in a vicinity of a rotating shaft of the arm, the electrical wire is fixed to the arm at a first fixing point and to a base for supporting the arm at a second fixing point so that the electrical wire is bent and deformed, and wherein the first fixing point is provided on a straight line defined by the rotating shaft of the arm and the second fixing point when the arm is at an intermediate position of swinging range of the arm.

In the electric power-feeding structure in accordance with the invention, the electrical wire is routed alongside the arm which drives the raising or lowering of the moving body, so that a major portion of the electrical wire which follows the raising and lowering of the moving body can be restricted by the arm. Further, in the vicinity of the rotating shaft of the arm, which is a movable portion, the electrical wire is routed in such a manner as to be capable of undergoing flexural deformation, thereby allowing the electrical wire to follow the raising or lowering of the moving body. In the electrical wire which is routed in the vicinity of the rotating shaft of the arm, looseness can occur in conjunction with the raising or lowering of the moving body. However, the stroke of the peripheral portion of the rotating shaft of the arm is smaller than the stroke of the moving body, and an excess length required for the electrical wire which is routed in that portion can be small, so that the looseness produced therein can also be made small. Furthermore, the fixing portion of the electrical wire on the base is provided on the straight line L1 defined by the rotating shaft of the arm and the fixing portion of the electrical wire on the arm when the arm is at the intermediate position of its swinging range, and the bend of the electrical wire accompanying the swinging motion of the arm is made uniform with the straight line located therebetween. Accordingly, the looseness of the electrical wire can be reduced further. Hence, a member for restricting the movement of the electrical wire, such as a case for accommodating the electrical wire, is not separately required, so that it is possible to miniaturize and simplify the electric power-feeding structure.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Referring now to the accompanying drawings, a description will be given of a preferred embodiment of an electric power-feeding structure in accordance with the invention.

Figure 1:
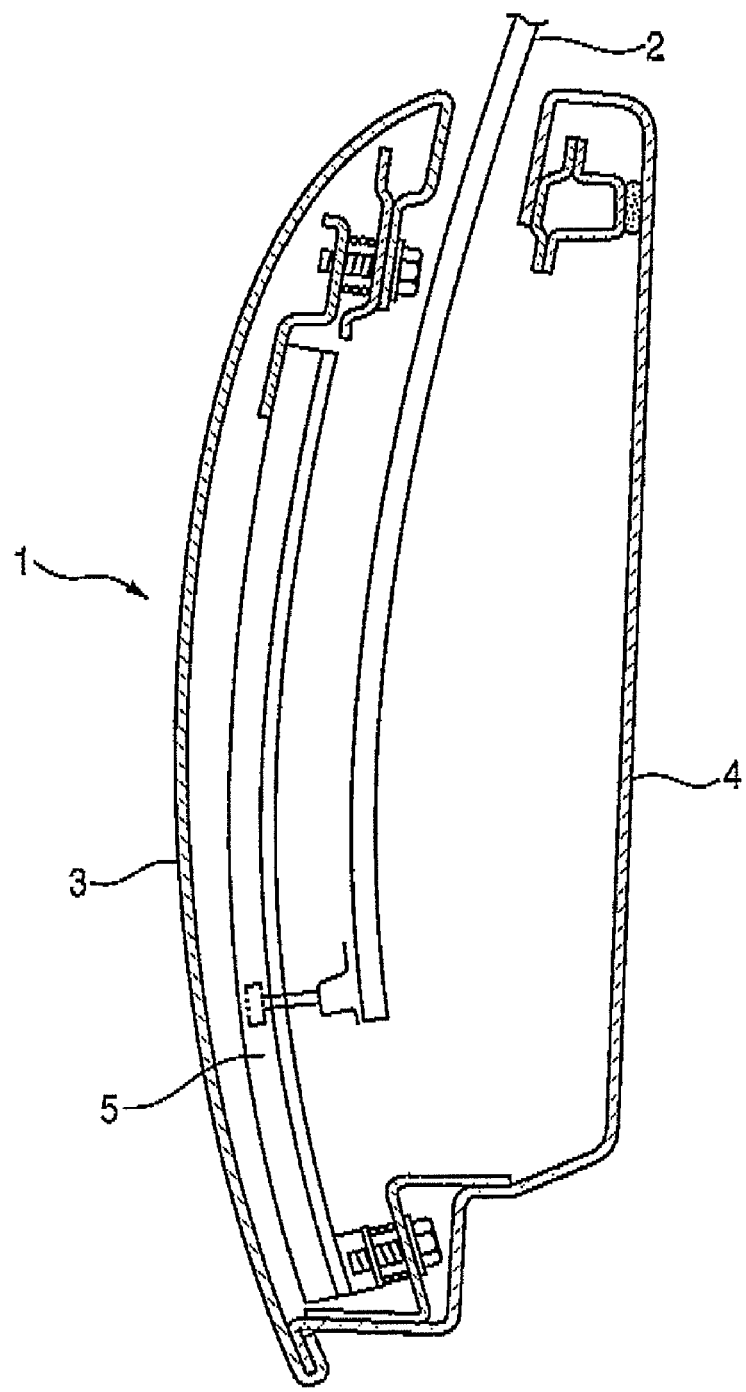
FIG. 1 is a cross-sectional view of a door of an automobile to which the electric power-feeding structure in accordance with the invention is applied.
Figure 2:
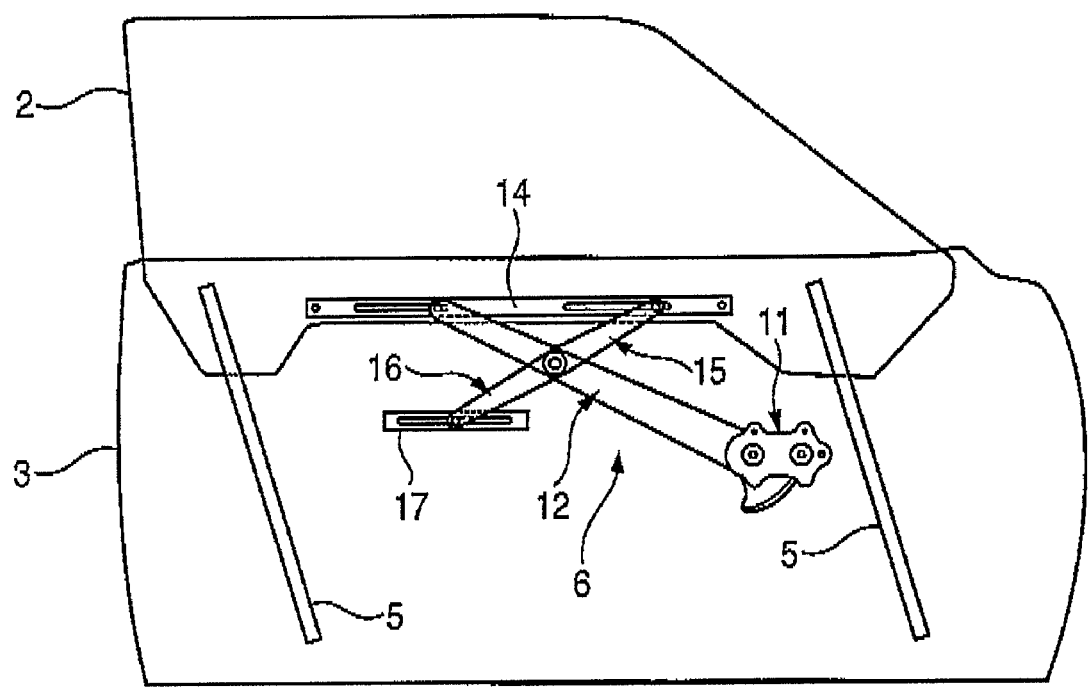
FIG. 2 is a front elevational view illustrating a raising and lowering mechanism of a window glass of the door shown in FIG. 1.
Figure 3:
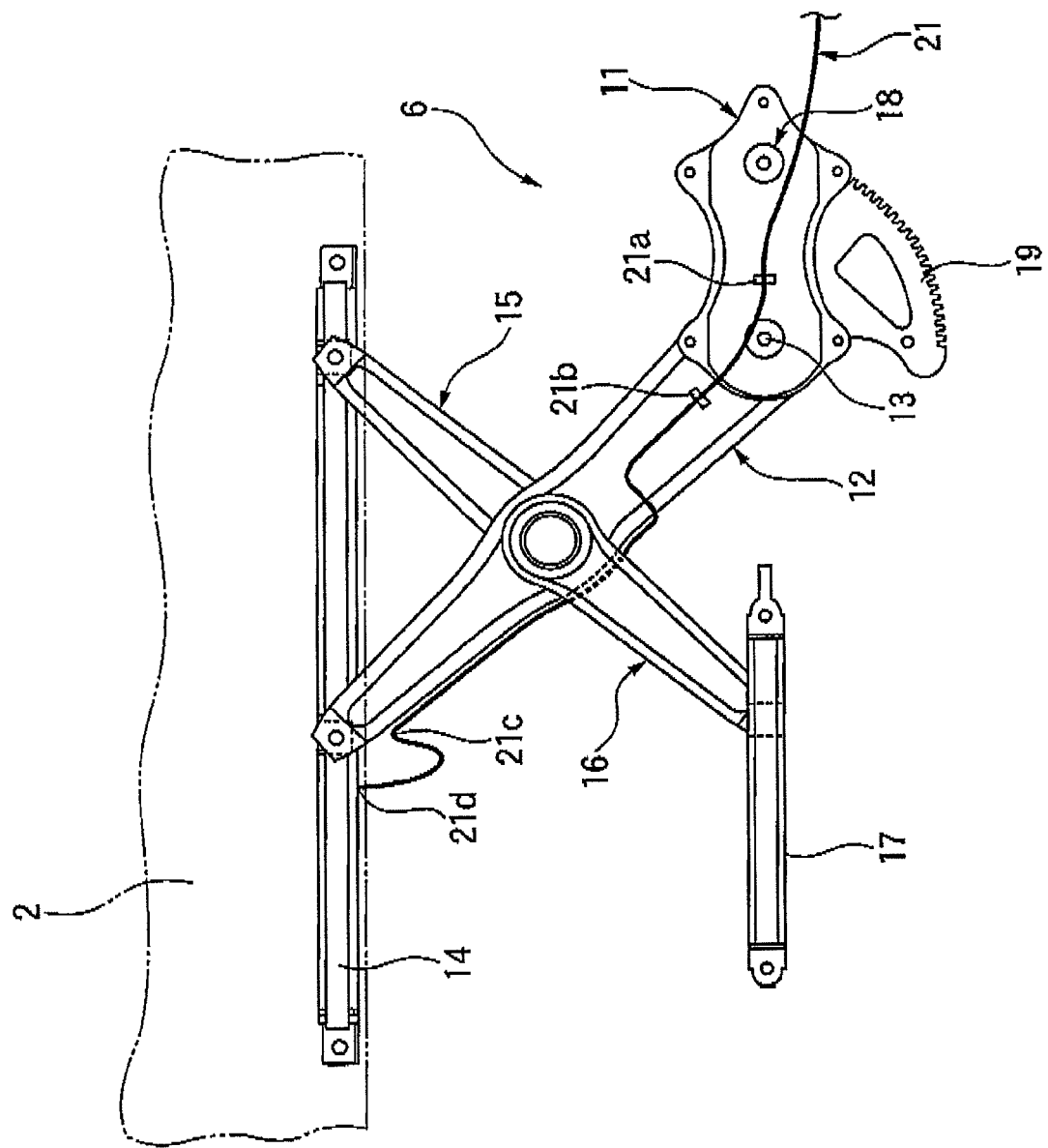
FIG. 3 is a detailed front elevational view of the raising and lowering mechanism shown in FIG. 2 and illustrates an embodiment of the electric power-feeding structure in accordance with the invention.
Figure 4:
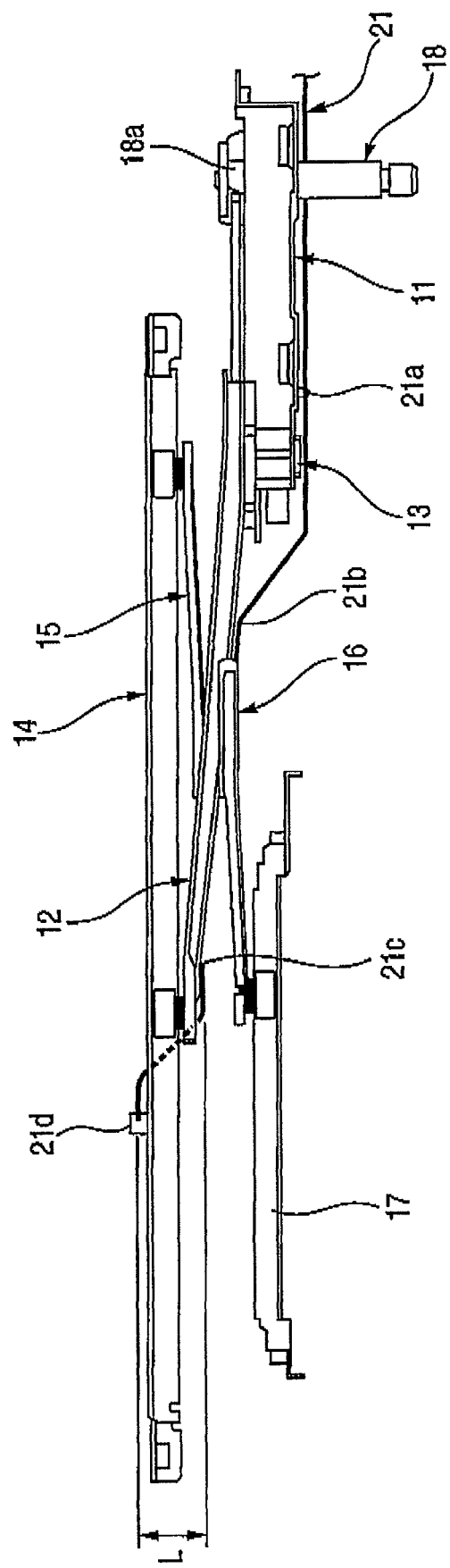
FIG. 4 is a plan view of the raising and lowering mechanism shown in FIG. 3.
Figure 5A:
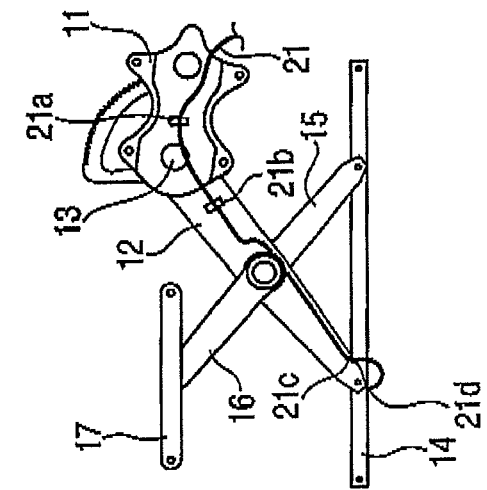
FIGS. 5A to 5C are front elevational views illustrating the operation of the electric power-feeding structure shown in FIG. 3 in conjunction with the raising or lowering of the window glass.
Figure 5B:
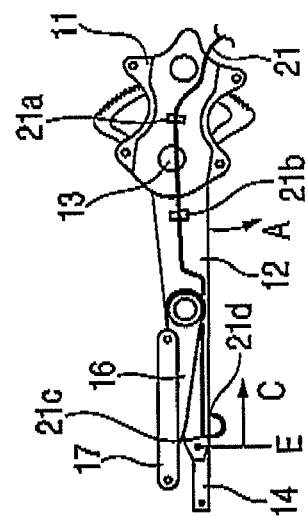
Figure 5C:
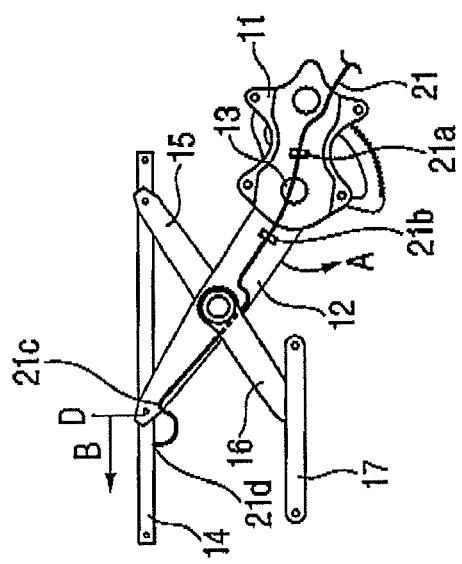
Figure 6:
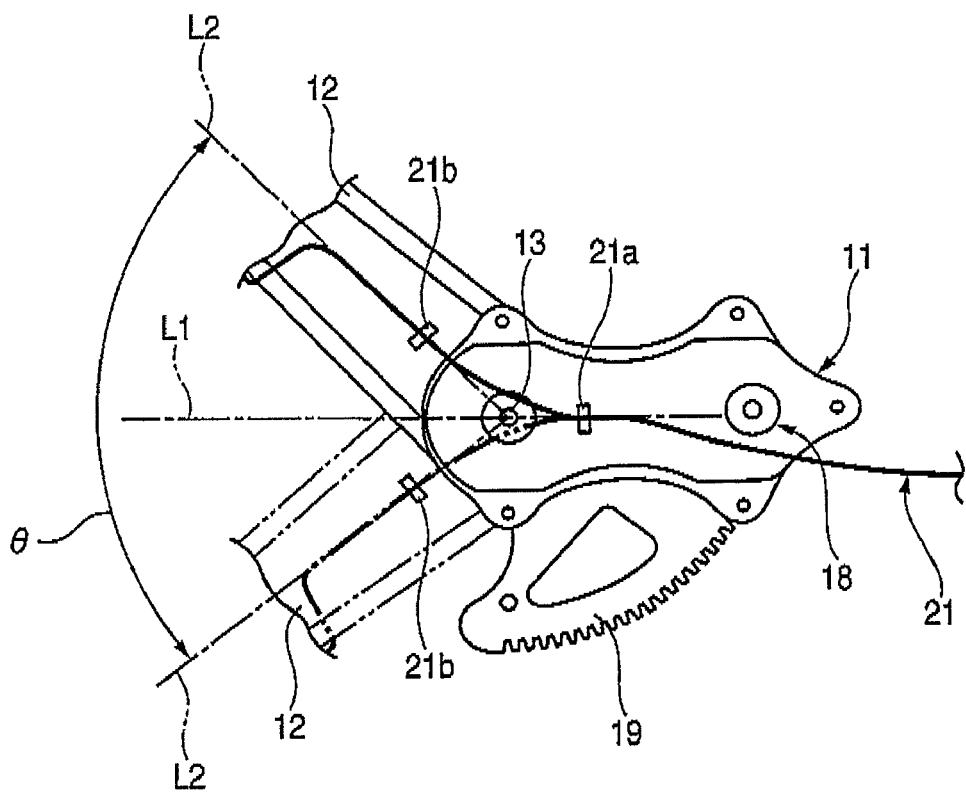
FIG. 6 is a front elevational view illustrating the operation of an electrical wire routed in a vicinity of a rotating shaft of an arm in the electric power-feeding structure shown in FIG. 3.
Figure 7A:
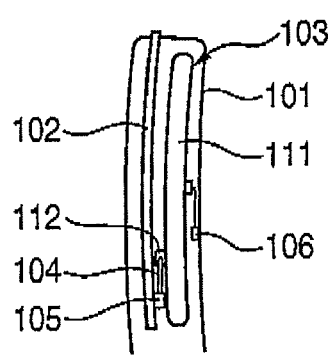
FIGS. 7A and 7B are cross-sectional views of a door of an automobile illustrating a conventional electric power-feeding structure.
Figure 7B:
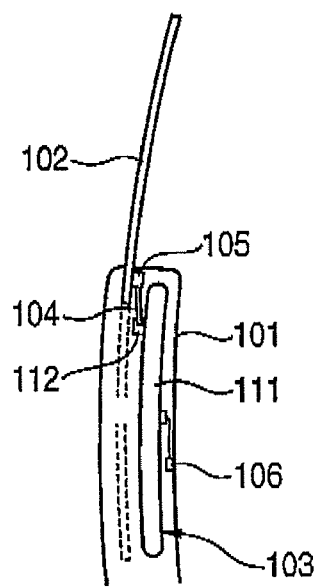

FIG. 1 is a cross-sectional view of a door of an automobile to which the electric power-feeding structure in accordance with the invention is applied. FIG. 2 is a front elevational view illustrating a raising and lowering mechanism of a window glass of the door shown in FIG. 1. FIG. 3 is a detailed front elevational view of the raising and lowering mechanism shown in FIG. 2 and illustrates an embodiment of the electric power-feeding structure in accordance with the invention. FIG. 4 is a plan view of the raising and lowering mechanism shown in FIG. 3. FIGS. 5A to 5C are front elevational views illustrating the operation of the electric power-feeding structure shown in FIG. 3 in conjunction with the raising or lowering of the window glass. FIG. 6 is a front elevational view illustrating the operation of an electrical wire routed in a vicinity of a rotating shaft of an arm in the electric power-feeding structure shown in FIG. 3.

As shown in FIGS. 1 and 2, the electric power-feeding structure in accordance with this embodiment is provided in the door of the automobile, and is adapted to feed electric power to the window glass which is disposed in this door and is driven to be raised or lowered. Hereafter, a description will be given of the raising and lowering mechanism of the window glass.

A door panel 1 is constructed such that an outer panel 3 and an inner panel 4, which are respectively press-formed into predetermined shapes, are joined, and a required space is formed therein.

A window glass 2 is interposed between the outer panel 3 and the inner panel 4, and is driven to be raised or lowered in a substantially vertical direction by the raising and lowering mechanism which will be described later. The window glass 2 is thereby made to emerge outside the door panel 1 through the gap between the outer panel 3 and the inner panel 4, which corresponds to an upper edge of the door panel 1, and dives back down into the inner space of the door panel 1.

A pair of glass guides 5 respectively extending in the substantially vertical direction are disposed between the window glass 2 and the outer panel 3 at a predetermined interval therebetween in a forward-backward direction, i.e., a longitudinal direction of the automobile. The movement of the window glass 2 in the substantially vertical direction is guided with its lower end engaged with the pair of glass guides 5.

Further, a window regulator (raising and lowering mechanism) 6 for driving the raising and lowering of the window glass 2 is disposed in the inner space of the door panel 1.

Referring further to FIGS. 3 and 4, the window regulator 6 is a window regulator of the so-called X-arm type and has a base plate 11 which is fixed to the door panel 1, a main arm 12 which is rotatably supported by this base plate 11, and a pair of auxiliary arms 15 and 16 which are rotatably supported by this main arm 12.

The main arm 12 is rotatably supported by the base plate 11 through a rotating shaft 13 provided at its proximal end. A distal end of the main arm 12 is coupled to a rail 14 fixed to a lower end portion of the window glass 2 and extending in the substantially forward-backward direction. The distal end of the main arm 12 is movable in the substantially forward-backward direction along the rail 14.

One auxiliary arm 15 and the other auxiliary arm 16 are respectively located on the obverse surface side and the reverse surface side of the main arm 12, and are respectively disposed to extend in a rectilinear direction and intersect the main arm 12 substantially in the form of an X-shape. Further, the pair of auxiliary arms 15 and 16 have their respective proximal ends supported rotatably by a substantially longitudinally central portion of the main arm 12 so as to rotate mutually coaxially and integrally.

In the same way as the distal end of the main arm 12, a distal end of the auxiliary arm 15 is coupled to the rail 14 fixed to the lower end portion of the window glass 2 and extending in the substantially forward-backward direction, and is movable in the substantially forward-backward direction along the rail 14. Meanwhile, a distal end of the auxiliary arm 16 is coupled to a rail 17 fixed to the door panel 1 and extending in the substantially forward-backward direction in parallel with the rail 14, and is movable in the substantially forward-backward direction along the rail 17.

A driving mechanism 18 is provided on the base plate 11. This driving mechanism 18 includes a driving source (which is not shown) such as a motor or a manual handle, as well as a pinion gear 18a which is rotated by the operation of this driving source. Further, a sector gear 19 is secured to the proximal end of the main arm 12 so as to rotate integrally therewith, and this sector gear 19 meshes with the pinion gear 18a of the driving mechanism 18.

In the above-described configuration, when the driving source of the driving mechanism 18 is operated, the main arm 12 is rotatably driven and is swung by the meshing between the pinion gear 18a of the driving mechanism 18 and the sector gear 19. In conjunction with the swinging motion of the main arm 12, the distal end of the main arm 12 moves in the forward-backward direction along the rail 14, and moves the rail 14 in the vertical direction. As a result, the window glass 2 is raised or lowered.

In a state in which the pair of auxiliary arms 15 and 16 are sandwiched between the rail 14 which is vertically moved and the rail 17 which is fixed to the door panel 1, the pair of auxiliary arms 15 and 16 rotate integrally while their respective distal ends are moved in the forward-backward direction along the rails 14 and 17 in conjunction with the vertical movement of the rail 14, allowing the posture of the rail 14 to be maintained. As a result, the window glass 2 is raised or lowered stably.

An electrical wire 21 for feeding electric power to the window glass 2 which is driven to be raised or lowered is introduced from the vehicle body side into the inner space of the door panel 1, is routed alongside the main arm 12, and is connected to the window glass 2. Specifically, the electrical wire 21 has its predetermined portion fixed to the base plate 11, is passed by a vicinity of the rotating shaft 13 of the main arm 12, reaches the distal end of the main arm 12 alongside a reverse surface or a side surface of the main arm 12 while bypassing a rotating shaft of the auxiliary arm 16, is extended from the distal end of the main arm 12, and is connected to the lower end portion of the window glass 2.

The electrical wire 21 is routed in such a manner as to be capable of undergoing flexural deformation in the vicinity of the rotating shaft 13 of the main arm 12 and from its extending portion at the distal end of the main arm 12 to its connecting portion in the window glass 2. The electrical wire 21, excluding these portions, is fixed to the reverse surface of the side surface of the main arm 12 in an entire region or a plurality of portions of the main arm 12 alongside which the electrical wire 21 extends. The fixing means is not particularly limited, but it is possible to use such as an adhesive tape or clips, for example. The electrical wire at its portion connected to the window glass 2 may be directly fixed to the lower end portion of the window glass 2, or may be fixed to an attachment member of the window glass 2 such as the rail 14.

Next, referring to FIGS. 5A to 5C, a description will be given of the operation of the electric power-feeding structure in accordance with this embodiment. FIG. 5A shows a state of the window regulator 6 when the window glass 2 is closed. FIG. 5B shows a state of the window regulator 6 when the window glass 2 is half open. FIG. 5C shows a state of the window regulator 6 when the window glass 2 is fully open.

From the state of the window regulator 6 shown in FIG. 5A, the main arm 12 is swung in the direction of arrow A as its proximal end is rotatably driven. In conjunction with the swinging motion of the main arm 12 in the direction of the arrow A, as sequentially shown in FIGS. 6S and 6C, the distal end of the main arm 12 reciprocally moves in the directions of arrows B and C along the rail 14 and lowers the rails 14. As a result, the window glass 2 is lowered and opened.

At an end portion of the electrical wire 21 which extends from the distal end of the main arm 12 and is connected to the window glass 2, a predetermined excess length is set for following the reciprocating motion in directions of arrows B and C of the distal end of the main arm 12 while undergoing flexural deformation. The more an extending portion 21c from the distal end of the main arm 12 and a fixing portion 21d on the rail 14 approach each other, the more looseness is produced in the electrical wire 21. However, the stroke of the distal end of the main arm 12 in the forward-backward direction is smaller than the stroke of the rail 14 in the vertical direction (stroke of the window glass 2). For this reason, an excess length required for the end portion of the electrical wire 21 can be short, and the looseness produced in this end portion can be made small.

In particular, in the electric power-feeding structure in accordance with this embodiment, the end portion of the electrical wire 21 extending from the distal end of the main arm 12 is connected to the window glass 2 by being fixed to the rail 14 at a position overlapping a central point of the stroke of the distal end of the main arm 12 at a distance L (see FIG. 4) in a direction (widthwise direction of the vehicle) perpendicular to both the raising and lowering direction (vertical direction) of the window glass 2 and the moving direction (forward-backward direction) of the distal end of the main arm 12. In such a configuration, the end portion of the electrical wire 21 is routed by being turned back in a U-shape along the raising and lowering direction of the window glass 2. As shown in FIGS. 5A to 5C, in conjunction with the movement of the distal end of the main arm 12, an advancing portion from the extending portion 21c from the distal end of the main arm 12 to a turn-back portion and a returning portion between the turn-back portion and the fixing portion 21d on the rail 14 pass a central point between strokes D and E of the distal end of the main arm 12 and pass each other on a plane perpendicular to the moving direction of the distal end of the main arm 12.

Thus, as the fixing portion 21d of the electrical wire 21 on the rail 14 is set to a position which overlaps the central point between the strokes D and E of the distal end of the main arm 12, an excess length required for the end portion of the electrical wire 21 can be set to approximately a half of the stroke of the distal end of the main arm 12, thereby making it possible to reduce the looseness produced in the end portion of the electrical wire 21.

In addition, at a portion of the electrical wire 21 which is routed in the vicinity of the rotating shaft 13 of the main arm 12, a predetermined excess length is set for following the swinging motion in the direction of arrow A of the main arm 12 while undergoing flexural deformation. The more the fixing portion 21a of the electrical wire 21 on the base plate 11 and the fixing portion 21b on the main arm 12 approach each other, the more looseness is produced in the electrical wire 21. However, since the fixing portion 21b of the electrical wire 21 on the main arm 12 is close to the rotating shaft 13, its stroke is relatively small. For this reason, an excess length required for the portion of the electrical wire 21 routed in the vicinity of the rotating shaft 13 of the main arm 12 can be short, and the looseness produced in this end portion can be made small.

In particular, in the electric power-feeding structure in accordance with this embodiment, as shown in FIGS. 5A to 5C, the electrical wire 21 is fixed to the main arm 12 and the base plate 11, respectively. When the main arm 12 is at an intermediate position in a swinging range shown in FIG. 5B, a fixing portion 21a of the electrical wire 21 on the base plate 11 is provided on an opposite side to a fixing portion 21b across the rotating shaft 13 located therebetween on a straight line defined by the fixing portion 21b of the electrical wire 21 on the main arm 12 and the rotating shaft 13 of the main arm 12. In other words, as shown in FIG. 6, in the process in which the main arm 12 is swung from an upper limit position (position shown in FIG. 5A) of its swinging range to a lower limit position (position shown in FIG. 5C) thereof, the fixing portion 21a of the electrical wire 21 on the base plate 11 is provided on the opposite side to the fixing portion 21b across the rotating shaft 13 located therebetween on a bisector L1 of an angle θ formed by segments L2 connecting the fixing portion 21b of the electrical wire 21 on the main arm 12 and the rotating shaft 13 of the main arm 12.

In the above-described configuration, as shown in FIG. 6, when the main arm 12 is at the upper limit position of its swinging range and when it is at the lower limit position thereof, the bend of the electrical wire 21 becomes uniform with the straight line L1 located therebetween. Accordingly, as compared with a case where the bend of the electrical wire 21 is offset toward one side of the straight line L1, the looseness produced in the electrical wire 21 can be reduced further. Furthermore, the bend of the electrical wire 21 can be small, and the load applied to the electrical wire 21 can be reduced.

Further, in the state in which the pair of auxiliary arms 15 and 16 are sandwiched between the rail 14 which is lowered and the rail 17 which is fixed to the door panel 1, the pair of auxiliary arms 15 and 16 rotate integrally while their respective distal ends are moved in the forward-backward direction along the rails 14 and 17 in conjunction with the lowering of the rail 14. In that process, the auxiliary arm 15 passes over the reverse surface of the main arm 12. However, the electrical wire 21 is secured alongside the side surface of the main arm 12 in a range in which the electrical wire 21 overlaps with the auxiliary arm 16, so that its interference with the auxiliary arm 16 is avoided. Accordingly, it is possible to narrow the gap between the main arm 12 and the auxiliary arm 16.

As described above, according to the electric power-feeding structure of this embodiment, the electrical wire 21 is routed alongside the main arm 12 which drives the raising or lowering of the window glass 2, so that a major portion of the electrical wire 21 which follows the raising and lowering of the window glass 2 can be restricted by the main arm 12. Further, in the vicinity of the rotating shaft 13 of the main arm 12, which is a movable portion, the electrical wire 21 is routed in such a manner as to be capable of undergoing flexural deformation, thereby allowing the electrical wire 21 to follow the raising or lowering of the window glass 2. In the electrical wire 21 which is routed in the vicinity of the rotating shaft 13 of the main arm 12, looseness can occur in conjunction with the raising or lowering of the window glass 2. However, the stroke of the peripheral portion of the rotating shaft 13 of the main arm 12 is smaller than the stroke of the window glass 2, and an excess length required for the electrical wire 21 which is routed in that portion can be small, so that the looseness produced therein can also be made small. Furthermore, the fixing portion 21a of the electrical wire 21 on the base plate 11 is provided on the straight line L1 defined by the rotating shaft 13 of the arm 12 and the fixing portion 21b of the electrical wire 21 on the main arm 12 when the main arm 12 is at the intermediate position of its swinging range, and the bend of the electrical wire 21 accompanying the swinging motion of the main arm 12 is made uniform with the straight line L1 located therebetween. Accordingly, the looseness of the electrical wire 21 can be reduced further. Hence, a member for restricting the movement of the electrical wire, such as a case for accommodating the electrical wire, is not separately required, so that it is possible to miniaturize and simplify the electric power-feeding structure.

It should be noted that the invention is not limited to the above-described embodiment, and modifications, improvements, and the like are possible, as required. In addition, the shapes, dimensions, numerical values, forms, numbers, places of disposition, and the like of the respective constituent elements in the above-described embodiment are arbitrary and are not limited insofar as they are capable of attaining the invention.

For example, although in the above-described embodiment a description has been given of the example in which the invention is applied to the X-arm type window regulator 6 having the main arm 12 and the pair of auxiliary arms 16 and 16, the invention is also similarly applicable to a single-arm type window regulator having only the main arm 12. In addition, the fixing portion 21a may be located on the rotating shaft 13 of the main arm 12.

What is claimed is:

1. A regulator in a vehicle, comprising:
    a base;
    an arm rotatably supported by the base, said arm having a distal end connected to a moving body movable in a direction perpendicular to a raising or lowering direction of the moving body and a proximal end rotatably connected to the base about a rotating shaft to thereby drive the raising or lowering of the moving body,
    wherein an electrical wire is routed alongside the arm, and one end of the electrical wire extending from the distal end of the arm is connected to the moving body to feed electric power to the moving body,
    wherein, proximate to the rotating shaft, the electrical wire is fixed to the arm at a first fixing point and to the base at a second fixing point so that the electrical wire is bent and deformed, and
    wherein the first fixing point is provided on a straight line defined by the rotating shaft of the arm and the second fixing point when the arm is at an intermediate position of swinging range of the arm.

2. A regulator in a vehicle according to claim 1, wherein the first fixing point is arranged on the opposite side of the second fixing point across the rotating shaft of the arm.

* * * * *